(12) United States Patent
Degowske

(10) Patent No.: US 8,640,842 B2
(45) Date of Patent: Feb. 4, 2014

(54) CLUTCH PLATE HAVING INTEGRATED SEPARATING FEATURE

(75) Inventor: Robert J. Degowske, Fair Haven, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 367 days.

(21) Appl. No.: 13/043,924

(22) Filed: Mar. 9, 2011

(65) Prior Publication Data
US 2012/0228077 A1  Sep. 13, 2012

(51) Int. Cl.
*F16D 13/52* (2006.01)
*F16D 13/69* (2006.01)

(52) U.S. Cl.
USPC .................... 192/70.19; 192/70.28

(58) Field of Classification Search
USPC ............... 192/70.2, 70.28, 85.39, 70.19
See application file for complete search history.

(56) References Cited

U.S. PATENT DOCUMENTS

| | | | |
|---|---|---|---|
| 2,856,049 A | 10/1958 | Schjolin | |
| 4,010,831 A | 3/1977 | Reuter | |
| 4,676,356 A | 6/1987 | Beccaris et al. | |
| 4,802,564 A | 2/1989 | Stodt | |
| 4,860,871 A | 8/1989 | Graton et al. | |
| 4,940,124 A | 7/1990 | Galuska et al. | |
| 4,972,932 A | 11/1990 | Nakamura et al. | |
| 5,358,085 A | 10/1994 | Flotow et al. | |
| 5,386,899 A | 2/1995 | Sterling et al. | |
| 5,566,803 A | 10/1996 | Lindner et al. | |
| 5,617,939 A | 4/1997 | Memmel et al. | |
| 6,026,944 A | 2/2000 | Satou et al. | |
| 6,347,695 B1 * | 2/2002 | Kuhn et al. | 192/70.12 |
| 6,508,337 B1 * | 1/2003 | Esper | 188/71.5 |
| 6,523,662 B1 | 2/2003 | Orlamunder | |
| 6,634,478 B2 | 10/2003 | Landa et al. | |
| 6,644,453 B2 | 11/2003 | Kremer | |
| 6,782,985 B2 | 8/2004 | Lohaus et al. | |
| 7,201,696 B2 | 4/2007 | DeGowske | |
| 7,363,995 B2 | 4/2008 | Downs et al. | |
| 7,559,390 B2 | 7/2009 | Marsh et al. | |
| 7,837,587 B2 | 11/2010 | Millar | |
| 2003/0150674 A1 | 8/2003 | Daigre | |
| 2006/0081437 A1 | 4/2006 | Puiu | |
| 2007/0037654 A1 | 2/2007 | DeGowske | |
| 2007/0158160 A1 | 7/2007 | Puiu | |
| 2009/0101458 A1 * | 4/2009 | Strandberg et al. | 188/218 XL |
| 2009/0294238 A1 | 12/2009 | Gilmore | |
| 2009/0314601 A1 | 12/2009 | Copeland | |

FOREIGN PATENT DOCUMENTS

| | | |
|---|---|---|
| GB | 644968 A | 10/1950 |
| JP | 1182626 A | 7/1989 |

* cited by examiner

Primary Examiner — Richard M. Lorence
(74) Attorney, Agent, or Firm — Harness, Dickey & Pierce, P.L.C.

(57) ABSTRACT

A friction clutch assembly that selectively engages an input member and an output member to allow selective transfer of torque therebetween is provided. A clutch pack includes a first clutch member and a second clutch member. One of the first clutch member or the second clutch member is operatively coupled to the input member. The other of the first and second clutch members is operatively coupled to the output member. The first clutch member comprises an annular body that has a circumferential outer surface including a plurality of splines extending outwardly from the annular body. At least one of the splines has a deflected portion that is integrally formed with the annular body and curved in a circumferential direction toward a distal tip.

12 Claims, 5 Drawing Sheets

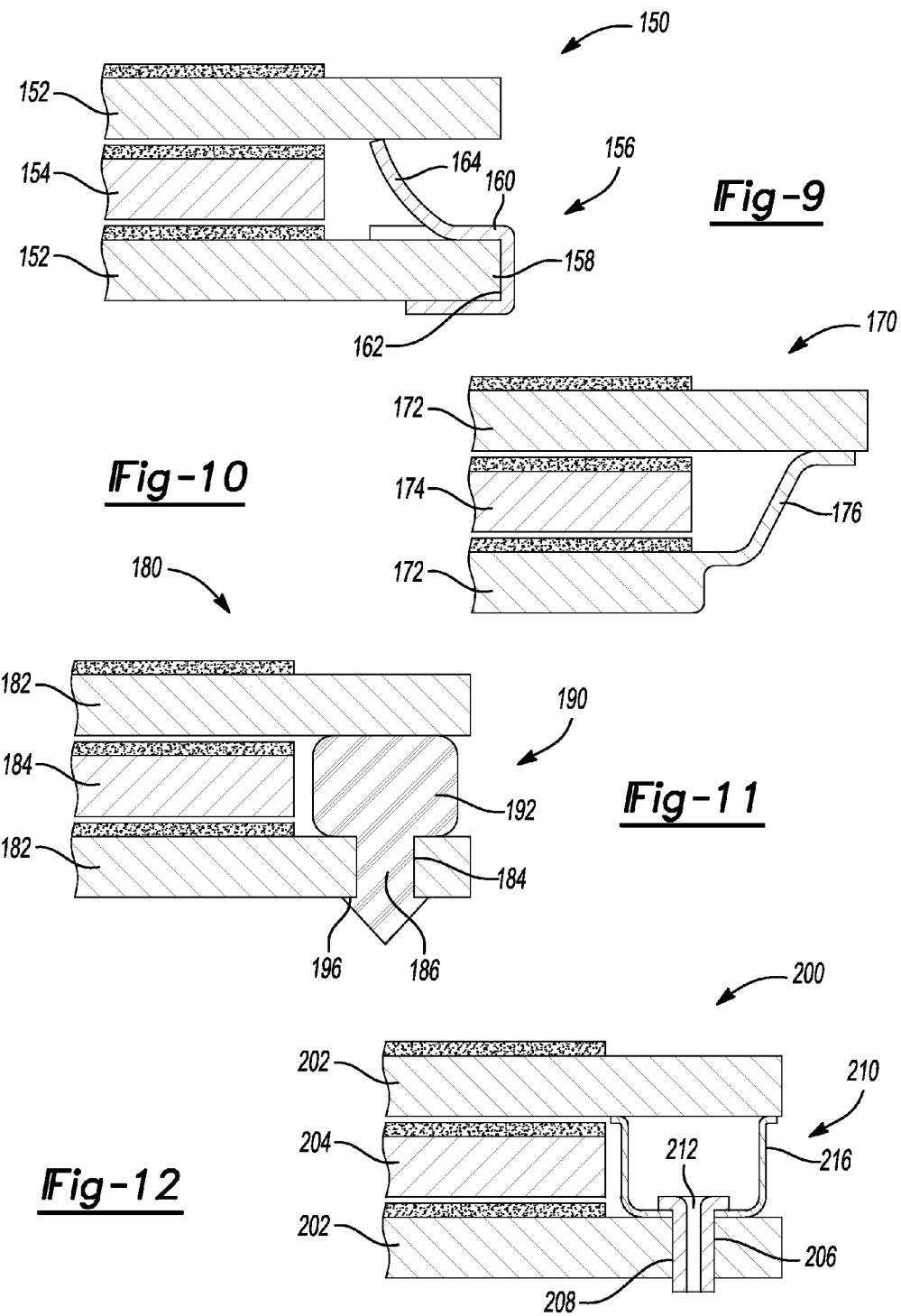

CLUTCH PLATE HAVING INTEGRATED SEPARATING FEATURE

FIELD

The present disclosure relates to a friction clutch assembly and, more particularly, relates to a clutch member in the friction clutch assembly that incorporates an integrated separating feature in the form of a spline having a deflected portion that is integrally formed with the clutch member and curved toward a distal tip.

BACKGROUND

The statements in this section merely provide background information relating to the present disclosure and may not constitute prior art.

Friction clutch assemblies are often used to selectively transfer torque between an input member and an output member. For example, some vehicles include a selective torque transfer device (e.g., a limited slip differential) for selectively coupling a rotating input shaft and an output shaft. The clutch assembly selectively engages to transfer torque between the input shaft and the output shaft and selectively disengages to disengage the input and output shafts.

Many conventional clutch assemblies include a plurality of input clutch plates that are coupled to the input member and a plurality of output clutch plates that are coupled to the output member. The input and output clutch plates are alternatingly arranged (i.e., interleaved) in a clutch pack. The clutch assembly also includes an actuator, such as a mechanical or hydraulic actuator that can be actuated by a control system between a disengaged and an engaged position. The control system causes the actuator to move from a disengaged position, in which the input and output clutch plates are spaced away from each other, to the engaged position, in which the input and output clutch plates engage to thereby transfer torque between the input and output members. Many conventional clutch assemblies require installation of a separate spring or springs within the clutch pack. The spring or springs facilitate separation of the input and output clutch plates in the disengaged position to reduce drag.

SUMMARY

This section provides a general summary of the disclosure, and is not a comprehensive disclosure of its full scope or all of its features.

A friction clutch assembly that selectively engages an input member and an output member to allow selective transfer of torque therebetween is provided. A clutch pack includes a first clutch member and a second clutch member. One of the first clutch member or the second clutch member is operatively coupled to the input member. The other of the first and second clutch members is operatively coupled to the output member. The first clutch member comprises an annular body that has a circumferential outer surface including a plurality of splines extending outwardly from the annular body. At least one of the splines comprises a deflected spline having a deflected portion that is integrally formed with the annular body and curved in a circumferential direction toward a distal tip.

According to additional features, the first clutch member defines a circumferential notch formed between the annular body and the deflected spline. The deflected spline has a circumferential extent that defines an axial height that varies along the circumferential extent. At least three deflected splines are separated circumferentially substantially equivalent distances from each other.

According to still other features, the first clutch member comprises a plurality of first clutch members. The second clutch member comprises a plurality of second clutch members. The first and second clutch members are alternatingly arranged in a clutch pack housing. The deflected portions of the deflected splines of one of the first clutch members is rotationally offset from corresponding deflected splines of another of the first clutch members. The notch is a radial notch that extends a first circumferential distance. A corresponding spline of the deflected splines extends a second circumferential distance. In one configuration, the first circumferential distance is at least half of the second circumferential distance. According to one example, the first clutch member has twelve splines. Three of the twelve splines are deflected splines. Each deflected spline has a bridge portion that connects the annular body to the deflected portion. The bridge portion intersects a circumferential profile of the circumferential outer surface of the annular body.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 9 is a cross-sectional view of a partial clutch pack that incorporates separating members constructed in accordance to additional features of the present teachings;

FIG. 10 is a cross-sectional view of a partial clutch pack that incorporates separating members constructed in accordance to additional features of the present teachings;

FIG. 11 is a cross-sectional view of a partial clutch pack that incorporates separating members constructed in accordance to additional features of the present teachings; and FIG. 12 is a cross-sectional view of a partial clutch pack that incorporates separating members constructed in accordance to additional features of the present teachings.

DETAILED DESCRIPTION

Example embodiments will now be described more fully with reference to the accompanying drawings.

Figure 1:
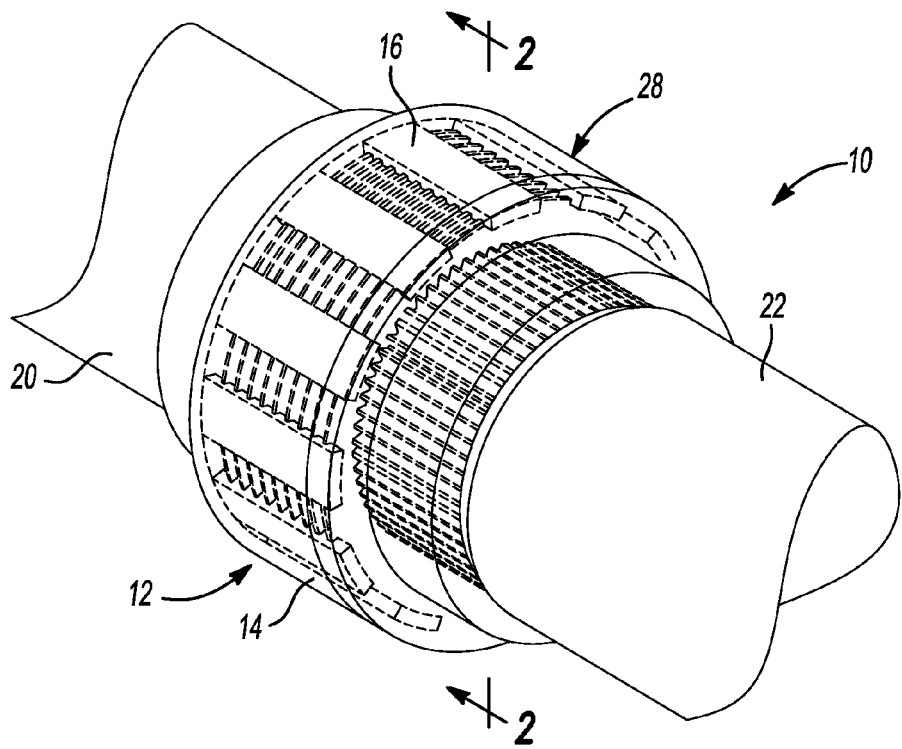
FIG. 1 is a perspective view of a friction clutch assembly constructed in accordance to one example of the present teachings.
Figure 2:
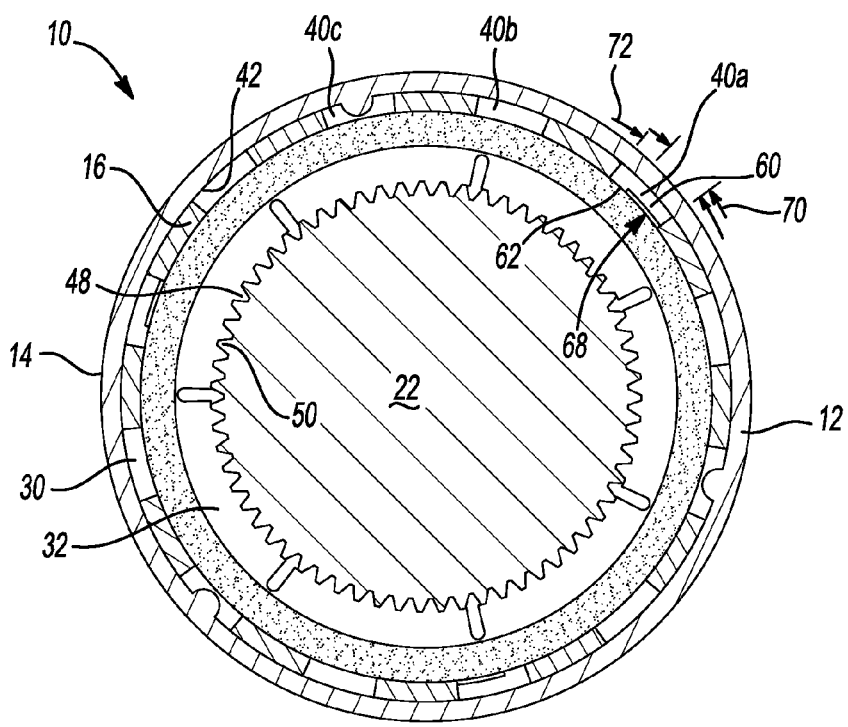
FIG. 2 is a cross-sectional view of the friction clutch assembly taken along lines 2-2 of FIG. 1.

With initial reference to FIGS. 1 and 2, a friction clutch assembly constructed in accordance to the present teachings is shown and generally identified at reference numeral 10. The friction clutch assembly 10 is enclosed in a housing 12. The housing 12 includes an outer housing 14 and a drum 16 that is fixed for rotation with an input member 20. The friction clutch assembly 10 is selectively operable for coupling the input member 20 to an output member 22 to transmit rotary power therebetween. It can be appreciated that rotary power transmitted to the output member 22 in one configuration can be received by a prop-shaft and transmitted to a differential (not specifically shown) of a vehicle. Thus, under certain conditions, such as when a vehicle is traveling on a low-traction surface, the friction clutch assembly 10 can be selectively engaged to facilitate an effective transfer of drive torque to a vehicle's drive wheels. It can also be appreciated that the friction clutch assembly 10 could be employed in any torque transmitting device where there is a need to selectively control the transmission of rotary power between two components (including the components of a differential).

The friction clutch assembly 10 includes a clutch pack generally indicated at reference numeral 28. The clutch pack 28 includes a plurality of first clutch members 30 and a plurality of second clutch members 32. The first and second clutch members 30, 32 can be plate-like structures that can be formed of a desired material and alternatingly arranged (i.e., interleaved) in the clutch pack 28. The clutch members 30, 32 can be formed of a metallic material such as steel including, but not limited to, 1095 steel, 5160 steel, 1020 steel, 1018 steel and 4140 steel. In some embodiments, the first and second clutch members 30, 32 can be immersed in a fluid, such as oil (not shown) and a pressure plate (not shown) can be employed to transmit force to the first clutch members 30. As previously identified, the friction clutch assembly 10 may be selectively actuated to drivingly interconnect the input member 20 and the output member 22.

Figure 3:
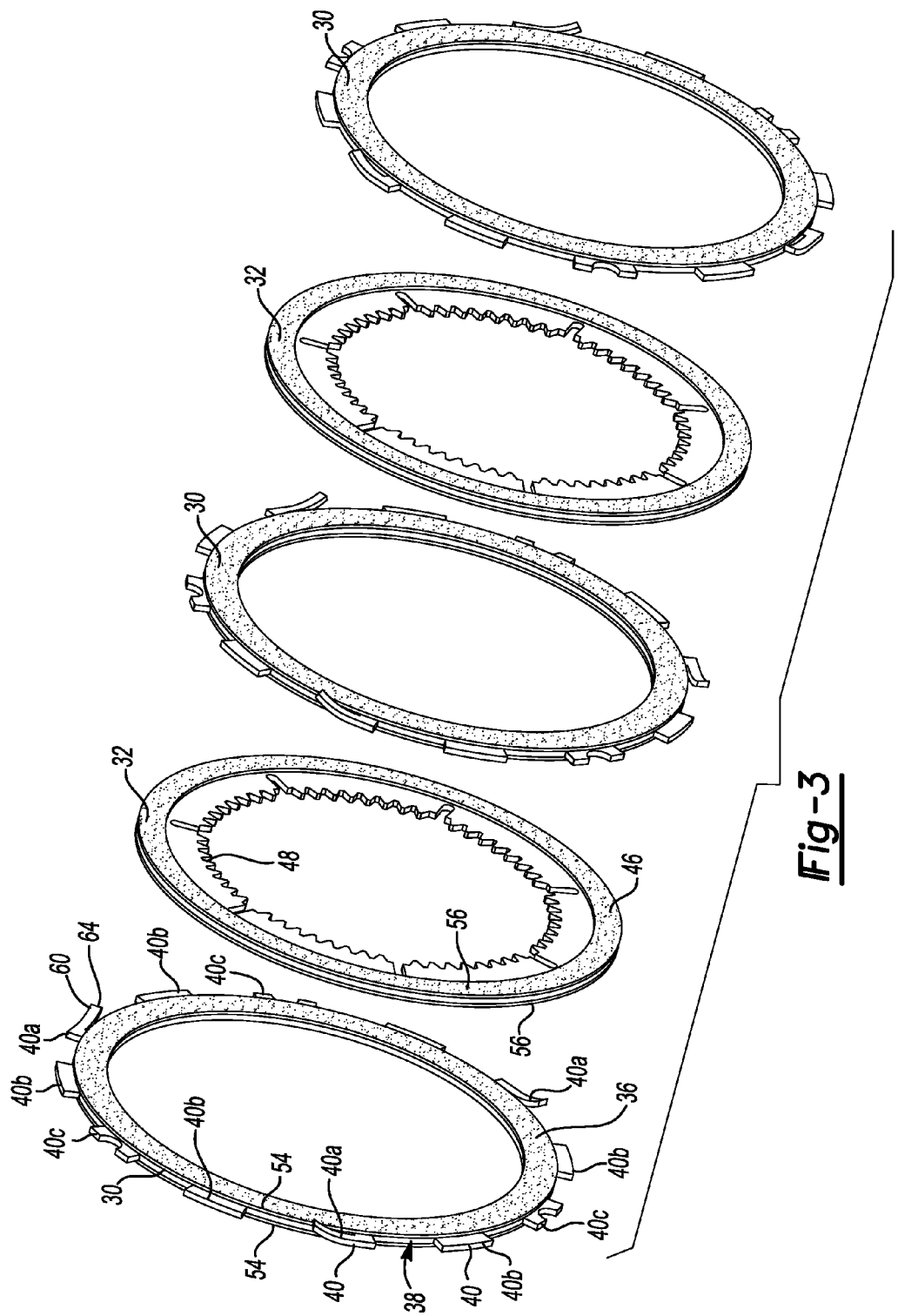
FIG. 3 is an exploded perspective view of select first and second clutch members of the friction clutch assembly of FIG. 1.

With additional reference now to FIG. 3, additional features of the first and second clutch members 30, 32 will be described. Each of the first clutch members 30 includes an annular body 36 that has a circumferential outer surface 38. A plurality of splines, collectively identified at reference numeral 40, extend outwardly from the circumferential outer surface 38. The plurality of splines 40 are fixed for rotation with the drum 16 and consequently the input member 20. More specifically, the plurality of splines 40 nests within annular recesses 42 arranged around the drum 16. Each of the second clutch members 32 generally includes an annular body 46 having a plurality of inner splines 48. The inner splines 48 are fixed for rotation with complementary splines 50 (FIG. 2) formed around the output member 22.

Each of the first clutch members 30 have a friction surface 54 formed generally around the annular body 36. Similarly, each of the second clutch members 32 have a friction surface 56 formed around the annular body 46. The respective friction surfaces 54 and 56 are aligned to engage with each other during actuation of the friction clutch assembly 10. While the friction surfaces 54 and 56 are shown operatively provided on both sides of each clutch members 54, 56 other configurations are contemplated. For example, the frictional surface may alternatively only be provided on one side of each of the first and second clutch members 30, 32. While not specifically shown, a piston can be slidably positioned proximate the housing 12. In one example, such a piston can be acted on by a pressurized fluid to selectively apply a clutch actuation force to the plurality of first clutch members 30 and second clutch members 32 to transfer torque through the friction clutch assembly 10.

With specific reference now to FIGS. 2 and 3, additional features of the plurality of first clutch members 30 will be described. The plurality of first splines 40 further includes a series of deflected splines 40a, a series of planar splines 40b and a series of cutout splines 40c. In the example shown, three deflected splines 40a, six planar splines 40b and three cutout splines 40c are provided around the circumferential outer surface 38 of the first clutch members 30. Other configurations and combinations are contemplated. The deflected splines 40a generally include a deflected portion 60 that connects through a bridge 62 to the annular body 36. The deflected portion 60 is integrally formed with the annular body 36 and curved in a circumferential direction toward a distal tip 64. While the deflected portion 60 is illustrated as being curved or non-linear from the bridge 62 to the distal tip 64, other geometries are contemplated. For example, the deflected portion 60 may be linear from the bridge 62 to the distal tip 64. A circumferential notch 68 is formed between the annular body 36 and the deflected portion 60 of the deflected spline 40a. The circumferential notch 68 can have a circumferential distance or arc length 70 (see FIG. 2). The deflected splines 40a can have a circumferential distance or arc length of 72. In one example, the arc length 70 of the circumferential notch 68 can be at least half of the arc length 72 of the deflected splines 40a.

As will be described herein, the deflected splines 40a provide a biasing force that biases first clutch members 30 away from adjacent second clutch members 32 to facilitate returning the clutch pack 28 to the unactuated (FIG. 4) position. In one example, the deflected splines 40a can be formed by way of a machining operation that initially incorporates the circumferential notch 68 and subsequently incorporates the curved profile of the deflected portion 60 from the bridge 62 to the distal tip 64. The circumferential notch 68 may be formed by any method such as a machining process. Similarly, the curved profile may be incorporated onto the deflected portion 60 by a forming operation. In this regard, no additional material or components are necessary for incorporating the deflected splines 40a into the clutch member 30.

Figure 5:
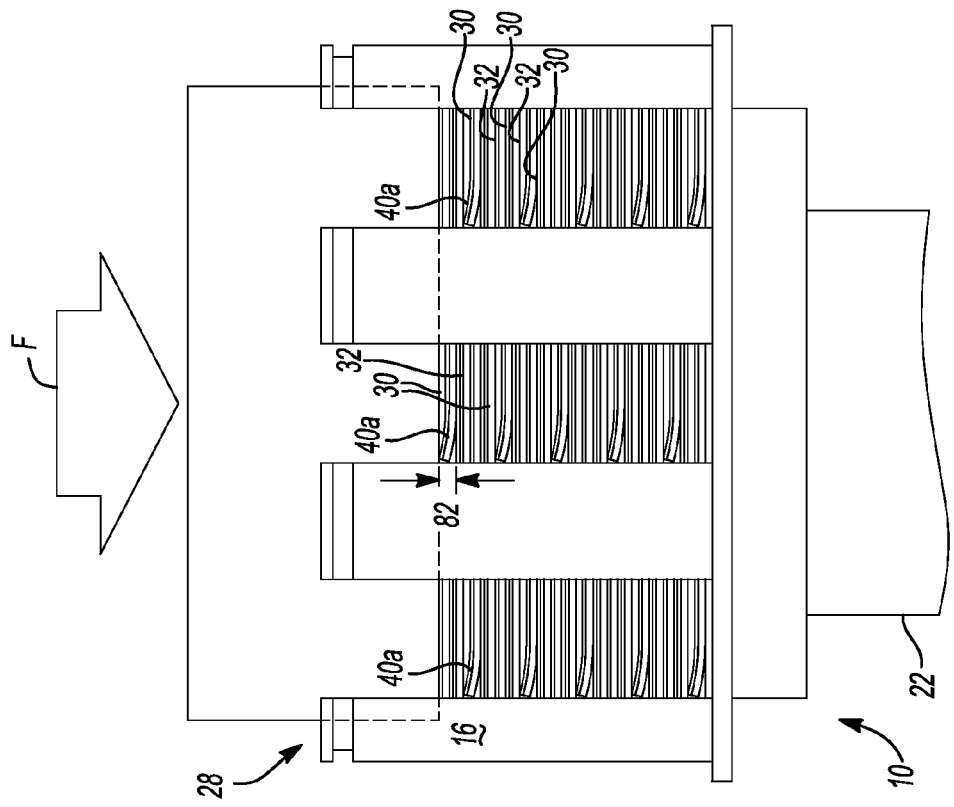
FIG. 5 is a side view of the friction clutch assembly of FIG. 1 and shown in an actuated, connected state.
Figure 4:
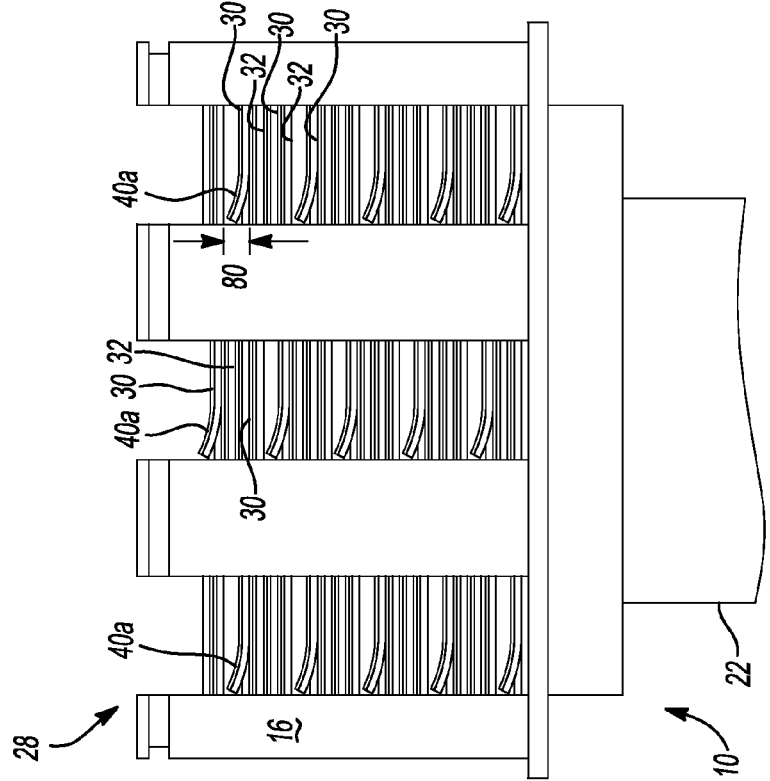
FIG. 4 is a side view of the friction clutch assembly of FIG. 1 and shown in an unactuated, disconnected state.

With reference now to FIGS. 4 and 5, an exemplary sequence of actuating the friction clutch assembly 10 from an unactuated position (FIG. 4) to an actuated position (FIG. 5) will be described. The clutch pack 28 of the friction clutch assembly 10 is shown in a fully disengaged position (FIG. 4), wherein the first clutch members 30 are spaced axially from the second clutch members 32, such that torque is not transferred between the input member 20 and output member 22. In FIG. 5, the clutch pack 28 of the friction clutch assembly 10 is shown in a fully engaged position where the first clutch members 30 and the second clutch members 32 are frictionally engaged to one another to facilitate the transfer of drive torque between the input member 20 and output member 22. It can be appreciated however that in some embodiments, the clutch pack 28 can also be partially engaged, wherein the first and second clutch members 30, 32 are partially moved toward each other, and some degree of torque transfer occurs therebetween.

As illustrated in FIG. 4, in the unactuated position, the deflected splines 40a have an axial height 80. In the actuated position shown in FIG. 5, the deflected splines 40a having an axial height 82. As shown, the axial height 82 is less than the axial height 80. Once the friction clutch assembly 10 is moved from the actuated position in FIG. 5 into the unactuated position in FIG. 4, the deflected portions 60 of the respective deflected splines 40a can facilitate a biasing motion that urges the plurality of first clutch members 30 away from the plurality of second clutch members 32.

During assembly of the respective pluralities of first and second clutch members 30 and 32, a first clutch member 30 can be installed within the drum 16, such that the deflected splines 40a of one first clutch member 30 is rotated axially from a nearest adjacent first clutch member 30 (see FIG. 4). In this regard, the deflected splines 40a can be uniformly arranged around the drum 16 to facilitate a uniform stacking and resulting biasing force. Because it is unnecessary to assemble distinct biasing members within the housing 12, such as between adjacent first and second clutch members 30 and 32, the time and difficulty required to assemble the friction clutch assembly 10 can be reduced.

Figure 6:
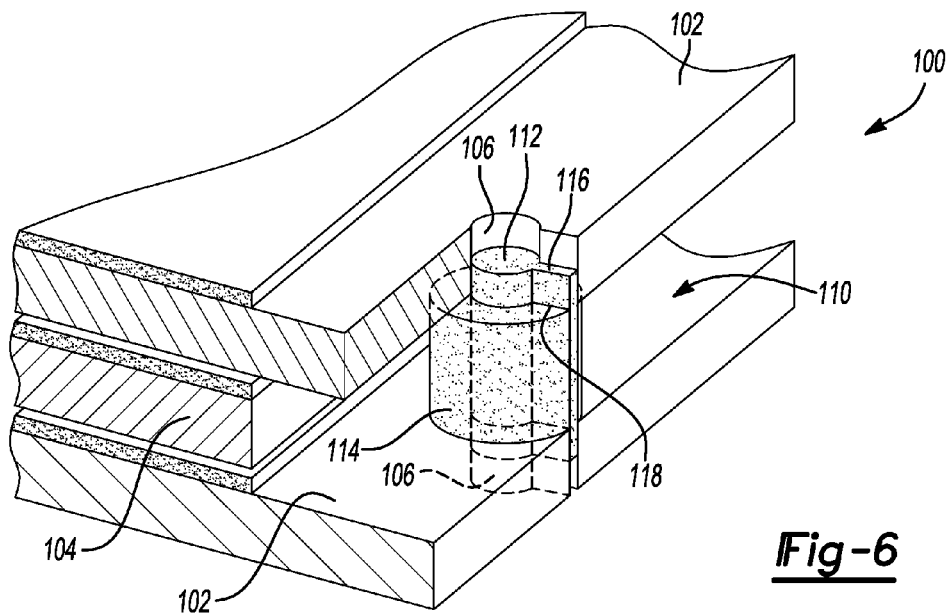
FIG. 6 is a side perspective view of a partial clutch pack incorporating a separating member constructed in accordance to additional features of the present teachings.

With reference now to FIGS. 6-12, additional features of the present disclosure will be described. As shown in FIG. 6, a partial clutch pack 100 includes first clutch members 102 separated by a second clutch member 104. The first clutch members 102 define a channel 106 that receives a separating member 110. The separating member 110 can generally include a rod 112 and a sleeve 114. The rod 112 includes a flange 116 that is received by a sleeve opening 118. Opposite ends of the rod 112 extend into the channels 106 of the adjacent first clutch members 102. The sleeve 114 can be formed of resilient material. In one example, the resilient material can urge the first clutch members 102 away from each other into the unactuated position.

Figure 7:
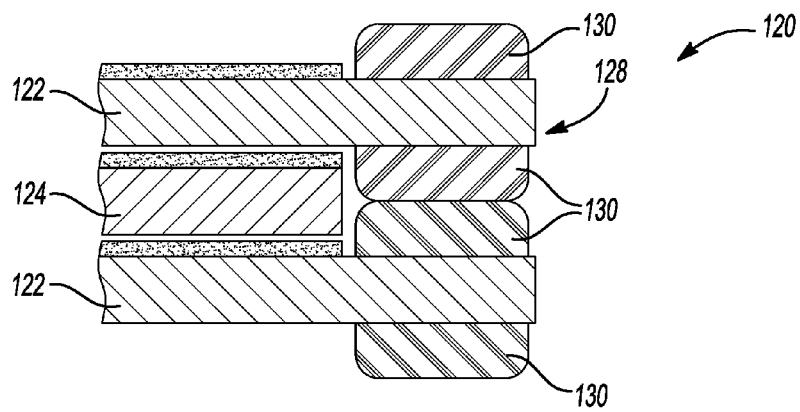
FIG. 7 is a cross-sectional view of a partial clutch pack that incorporates separating members constructed in accordance to additional features of the present teachings.

FIG. 7 illustrates a partial clutch pack 120 including first clutch members 122 separated by a second clutch member 124. Separating members 128 can be formed on the first clutch members 102. In one example, the separating members 128 can comprise resilient portions 130 that can be molded onto the first clutch members. The separating members 128 urge the first clutch members 102 away from each other into the disengaged position.

Figure 8:
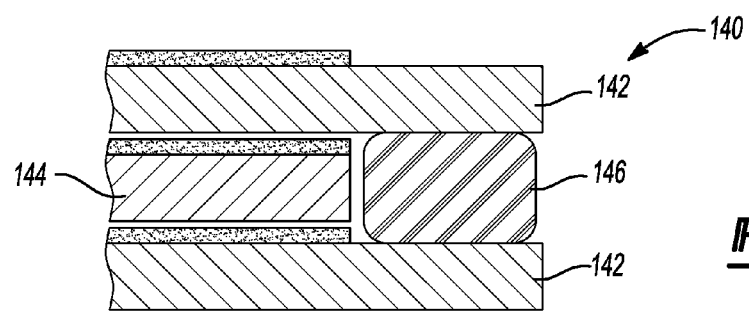
FIG. 8 is a cross-sectional view of a partial clutch pack that incorporates separating members constructed in accordance to additional features of the present teachings.

FIG. 8 illustrates a partial clutch pack 140 including first clutch members 142 separated by a second clutch member 144. A separating member 146 is positioned between the adjacent first clutch members 142. The separating member 146 can be molded to one of the first clutch members 142 and can provide a biasing force that urges that adjacent first clutch members 142 away from each other in the disengaged position. FIG. 9 illustrates a partial clutch pack 150 including first clutch members 152 separated by a second clutch member 154. A separating member 156 is coupled to a circumferential edge, such as a spline 158 of a first clutch member 152. The separating member 156 can be a clip 160 formed of metallic material. The clip 160 generally includes a main body portion 162 that wraps around the spline 168 and a ramped portion 164 that extends from the body 162 in a direction generally toward an adjacent first clutch member 152. The ramped portion 164 provides a biasing force that urges the first clutch members 152 away from each other in the disengaged position.

FIG. 10 illustrates a partial clutch pack 170 including first clutch members 172 separated by second clutch members 174. One of the first clutch members 172 includes an integrally formed separating member 176 that angles generally toward an adjacent first clutch member. The separating member 176 generally provides a biasing force that separates the first and second clutch members 172 and 174 away from each other in a disengaged position. FIG. 11 illustrates a partial clutch pack 180 including first clutch members 182 separated by a second clutch member 184. One of the first clutch members 182 defines an aperture 184 that receives a shank 186 of a separating member 190. The separating member 190 generally includes a bulbous portion 192 that is positioned between adjacent first clutch members 182. The shank 186 is retained in the aperture 184 by way of an overlap portion 196. The bulbous portion 192 provides a biasing force that urges the first clutch members 182 away from each other.

FIG. 12 illustrates a partial clutch pack 200 including first clutch members 202 separated by second clutch members 204. One of the first clutch members 202 defines an aperture 206 that receives a shank 208 of a separating member 210. The separating member 210 can generally comprise a rivet portion 212 that includes the shank 208 and a separating portion 216. The separating portion 216 biases the first clutch members 202 away from each other in the disengaged position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power transmitting device comprising:
    a first clutch member that is rotatable about an axis, the first clutch member having a set of first spline teeth that extend longitudinally along the axis;
    a second clutch member that is rotatable about an axis, the second clutch member having a set of second spline teeth that extend longitudinally along the axis, the second spline teeth being arranged concentric with the first spline teeth; and
    a clutch pack having a set of first clutch plates and a set of second clutch plates, the set of second clutch plates being interleaved with the set of first clutch plates, each of the first clutch plates having an annular body and a set of first plate teeth that are coupled to the annular body, the first plate teeth being meshingly engaged with the set of first spline teeth, each of the second clutch plates having a set of second plate teeth that are meshingly engaged to the set of second spline teeth;
    wherein the set of first plate teeth comprise a plurality of spring teeth and at least one locating tooth, the spring teeth on each of the first clutch plates being configured to provide a biasing force that urges a neighboring pair of the first clutch plates away from one another in an axial direction along the axis, the at least one locating tooth being configured differently from the spring teeth such that the at least one locating tooth orients its first clutch plate to the first clutch member in a manner where the spring teeth of each of the first clutch plates are disposed in rows that are disposed concentrically about the axis, wherein a quantity of the rows is equal to a quantity of spring teeth on one of the first clutch plates.

2. The power transmitting component of claim 1, wherein each spring tooth comprises a deflected portion and a bridge that interconnects the deflected portion to the annular body.

3. The power transmitting component of claim 2, wherein a circumferential notch is formed between the annular body and the deflected portion.

4. The power transmitting component of claim 1, wherein the at least one locating tooth comprises a tooth member with a first keying element formed thereon and wherein the first clutch member comprises a second keying element that is matingly engaged to the first keying element.

5. The power transmitting component of claim 4, wherein one of the first and second keying elements comprises a groove.

6. The power transmitting component of claim 1, wherein each of the first clutch plates comprises a plate member and a friction material that is coupled to the plate member, and wherein the plurality of spring teeth of each of the first clutch plates is configured to contact the plate member of the neighboring one of the first clutch plates.

7. The power transmitting component of claim 1, wherein each of the plurality of spring teeth comprises a spline and a separating member that is installed to the spline.

8. The power transmitting component of claim 7, wherein the separating member is formed of an elastomeric material.

9. The power transmitting component of claim 8, wherein the elastomeric material is cohesively bonded to the spline.

10. The power transmitting component of claim 8, wherein the elastomeric material defines a fastener that extends through and secures the elastomeric material to the spline.

11. The power transmitting component of claim 7, wherein a fastener secures the separating member to the spline.

12. The power transmitting component of claim 11, wherein the fastener comprises a rivet.

* * * * *